United States Patent
Jo et al.

(10) Patent No.: US 12,031,093 B1
(45) Date of Patent: Jul. 9, 2024

(54) METHOD OF PRODUCING PYROLYSIS OIL WITH REDUCED IMPURITIES

(71) Applicants: SK INNOVATION CO., LTD., Seoul (KR); SK GEO CENTRIC CO., LTD., Seoul (KR)

(72) Inventors: Sang Hwan Jo, Daejeon (KR); Soo Kil Kang, Daejeon (KR); Ho Won Lee, Daejeon (KR); Yong Seong Jeong, Daejeon (KR)

(73) Assignees: SK INNOVATION CO., LTD., Seoul (KR); SK GEO CENTRIC CO., LTD., Seoul (KR)

( * ) Notice: Subject to any disclaimer, the term of this patent is extended or adjusted under 35 U.S.C. 154(b) by 0 days.

(21) Appl. No.: 18/525,852

(22) Filed: Dec. 1, 2023

(30) Foreign Application Priority Data

Jul. 31, 2023 (KR) .................. 10-2023-0099389

(51) Int. Cl.
| | | |
|---|---|---|
| *C10G 1/10* | (2006.01) | |
| *C08J 11/12* | (2006.01) | |
| *C08J 11/24* | (2006.01) | |
| *C10G 1/00* | (2006.01) | |

(52) U.S. Cl.
CPC .................. *C10G 1/10* (2013.01); *C08J 11/12* (2013.01); *C08J 11/24* (2013.01); *C10G 1/002* (2013.01); *C08J 2367/02* (2013.01); *C10G 2300/1003* (2013.01); *C10G 2300/202* (2013.01); *C10G 2300/4006* (2013.01)

(58) Field of Classification Search
CPC ........ C08J 11/12; C08J 11/24; C08J 2367/02; C10G 1/002; C10G 1/10; C10G 2300/1003; C10G 2300/202; C10G 2300/4006
See application file for complete search history.

(56) References Cited

FOREIGN PATENT DOCUMENTS

| | | | |
|---|---|---|---|
| CN | 115626872 A | 1/2023 | |
| JP | 2003-034794 A | 2/2003 | |
| JP | 2019-532118 A | 11/2019 | |
| WO | WO-2021163102 A1 * | 8/2021 | ............. C08J 11/12 |
| WO | 2021/211529 A1 | 10/2021 | |
| WO | 2023/285472 A2 | 1/2023 | |

* cited by examiner

*Primary Examiner* — Brian A McCaig
(74) *Attorney, Agent, or Firm* — IP&T GROUP LLP

(57) ABSTRACT

Embodiments of the present disclosure relate to a method of producing pyrolysis oil that may reduce a content of impurities in pyrolysis oil. In the method of producing pyrolysis oil according to the present disclosure, in order to recycle polyethylene terephthalate (PET), monomers are recovered by depolymerizing polyethylene terephthalate with alcohol, and then a remaining depolymerization residue is used as an additive in pyrolysis production of waste plastics, such that a content of impurities in pyrolysis oil may be reduced.

16 Claims, 2 Drawing Sheets

METHOD OF PRODUCING PYROLYSIS OIL WITH REDUCED IMPURITIES

CROSS-REFERENCE TO RELATED APPLICATIONS

This application claims priority under 35 U.S.C. § 119 to Korean Patent Application No. 10-2023-0099389, filed on Jul. 31, 2023, the disclosure of which is incorporated herein by reference in its entirety.

TECHNICAL FIELD

Embodiments of the present disclosure relate to a method of producing pyrolysis oil having a reduced content of impurities.

BACKGROUND

Waste plastics, which are produced using petroleum as a feedstock, are difficult to recycle and are mostly disposed of as garbage. This waste take a long time to degrade in nature, which causes contamination of the soil and serious environmental pollution. As a method for recycling waste plastics, there is a method for pyrolyzing waste plastics and converting the pyrolyzed waste plastics into usable oil, and the obtained oil is called waste plastic pyrolysis oil.

However, pyrolysis oil obtained by pyrolyzing waste plastics cannot be used as a high-value-added fuel such as gasoline or diesel oil because it has a higher content of impurities such as chlorine, nitrogen, and metals than oil produced from crude oil through a common process. In particular, when a nitrogen component remains in the oil, a subsequent catalyst process may be adversely affected, and thus, the nitrogen component should be controlled below a certain level.

In the related art, nitrogen has been removed during a pyrolysis process by a method of removing nitrogen in advance by performing a process such as sorting or washing waste plastics, or a method of performing pyrolysis by additionally adding water or a strong base material during pyrolysis. However, when an additional process for sorting or washing is required, internal corrosion of a reactor occurs, or environmental pollution is caused due to waste water and off-gas. Accordingly, the development of economical processes that may reduce impurities in pyrolysis oil has been studied in many ways.

Polyethylene terephthalate (PET) is easily molded due to its large crystallinity and high melting point, and thus PET is widely used not only in fibers but also in films, bottles, and injection-type materials. In particular, when polyethylene terephthalate is used in a container such as a bottle due to its excellent mechanical properties including lightness, durability, and high transparency, and chemical properties such as gas permeability, chemical resistance, and high-quality content maintenance, a large amount of polyethylene terephthalate is discharged as waste.

There are two main ways to recycle polyethylene terephthalate discharged as waste: physical recycling and chemical recycling. Physical recycling involves using polyethylene terephthalate in the form of polyester chips or flakes, and chemical recycling is performed by recovering a polyester feedstock using a chemical reaction. Chemical recycling of polyethylene terephthalate is performed through depolymerization. Among them, methanolysis is a method of decomposing polyethylene terephthalate to recover ethylene glycol (EG) and dimethyl terephthalate (DMT). The recovered ethylene glycol (EG) and dimethyl terephthalate (DMT) may be recycled by being reused as a feedstock in a polyethylene terephthalate synthesis polymerization process. A recovery rate of ethylene glycol (EG) and dimethyl terephthalate (DMT) recovered by the methanolysis reaction is about 90%, and in this case, about 10% of a residue is generated. The methanolysis residue of polyethylene terephthalate is in the form in which unrecovered ethylene glycol and dimethyl terephthalate, a catalyst, a salt, and the like are unevenly mixed in a high-viscosity liquid, and this residue cannot be reused and is disposed of as waste. As a method for disposing of the residue, landfilling and the like are used, but this not only incurs additional processing costs, but also causes environmental pollution caused by landfilling the residue.

However, methanolysis of polyethylene terephthalate is actively used commercially because dimethyl terephthalate may be obtained with high purity in comparison to other polyethylene terephthalate chemical recycling methods, and dimethyl terephthalate is easy to recycle as a feedstock of polyethylene terephthalate. Accordingly, there is a need to develop an effective processing method for a residue generated by methanolysis of polyethylene terephthalate.

RELATED ART DOCUMENT

Patent Document

Japanese Patent Laid-Open Publication No. 2003-034794 (publication date: Feb. 7, 2003)

SUMMARY

An embodiment of the present disclosure is directed to providing a method of producing waste plastic pyrolysis oil having a minimized content of impurities by pyrolyzing waste plastics without sorting or pre-treating waste plastics containing impurities.

Another embodiment of the present disclosure is directed to providing a method of producing waste plastic pyrolysis oil that may improve a waste resource recycling effect and economic efficiency of a refining process of pyrolysis oil using a depolymerization residue of waste polyethylene terephthalate (PET) as an additive in a pyrolysis process.

In one general aspect, a method of producing waste plastic pyrolysis oil with reduced nitrogen includes: depolymerizing polyethylene terephthalate (PET) with alcohol to obtain a depolymerization product; separating monomers from the depolymerization product and recovering a remaining depolymerization residue; introducing the depolymerization residue and waste plastics into a pyrolysis reactor and pyrolyzing the waste plastics; and recovering pyrolysis oil in the pyrolysis reactor.

In the separating of the monomers operation, the waste plastics may be supplied in a solid phase to the pyrolysis reactor.

The alcohol may be, for example, methanol or ethanol.

The depolymerization residue may include sulfate.

The depolymerization residue may include ethylene glycol.

The depolymerization residue may include alkyl terephthalate.

The ethylene glycol may be included in an amount of 10 to 85 wt % with respect to the total weight of the depolymerization residue.

The sulfate may be included in an amount of 1 to 30 wt % with respect to the total weight of the depolymerization residue.

The sulfate may include an alkali metal sulfate or an alkaline earth metal sulfate.

The depolymerization residue may be included in an amount of 15 to 45 parts by weight with respect to 100 parts by weight of the waste plastics.

A pyrolysis temperature during the pyrolysis reaction may be from 300 to 900° C.

The method may further include, after the recovering of the pyrolysis oil, hydrotreating the recovered pyrolysis oil.

Other features and aspects will be apparent from the following detailed description, the drawings, and the claims.

DETAILED DESCRIPTION OF EMBODIMENTS

Unless the context clearly indicates otherwise, the singular forms of the terms used in the present specification may be interpreted as including the plural forms.

A numerical range used in the present specification includes upper and lower limits and all values within these limits, all double limited values, and all possible combinations of the upper and lower limits in the numerical range defined in different forms. Unless otherwise specifically defined in the present specification, values out of the numerical range that may occur due to experimental errors or rounded values also fall within the defined numerical range.

The expression "comprise(s)" described in the present specification is intended to be an open-ended transitional phrase having an equivalent meaning to "include(s)", "contain(s)", "have (has)", or "are (is) characterized by", and does not exclude elements, materials, or operations, all of which are not further recited herein.

Unless otherwise defined, a unit of "%" used in the present specification refers to "wt %".

Hereinafter, embodiments of the present disclosure will be described in detail with reference to the accompanying drawings. However, this is only illustrative, and the present disclosure is not limited to specific embodiments which are illustratively described by the present disclosure.

Pyrolysis oil obtained by pyrolyzing waste plastics cannot be used as a high-value-added fuel such as gasoline or diesel oil because it has a higher content of impurities such as chlorine, nitrogen, and metals than oil produced from crude oil through a common process. In particular, when a nitrogen component remains in the oil, a subsequent catalyst process may be adversely affected, and thus, the nitrogen component should be controlled below a certain level. In the related art, impurities contained in waste plastics to be used as a pyrolysis oil feedstock are removed using a sorting or washing process. However, as environmental pollution is caused by waste water and off-gas generated at this time, and an additional process such as sorting or washing waste plastics is required before the pyrolysis process, the process becomes complex and costs increase. In addition, alcohol depolymerization is widely used to recycle polyethylene terephthalate, one of the most used waste plastics, but in this case, a polyethylene terephthalate depolymerization residue is generated and should be disposed of as waste. Accordingly, the inventors of the present disclosure have found that a content of impurities, in particular, nitrogen, in pyrolysis oil could be significantly reduced by adding a residue generated during alcohol depolymerization of waste polyethylene terephthalate to a waste plastic pyrolysis process.

Figure 1:
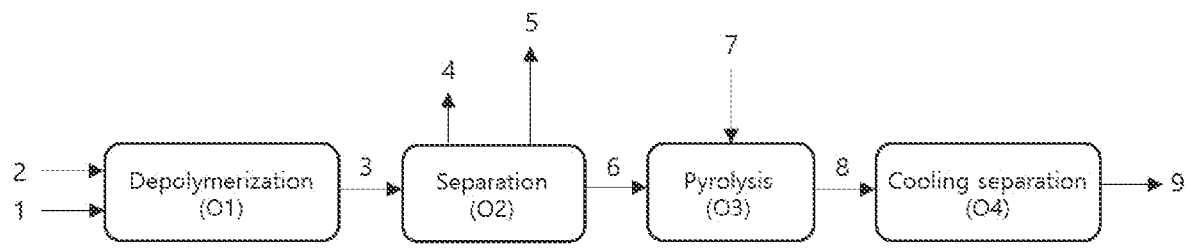
FIG. 1 is a schematic view illustrating a process according to an embodiment of the present disclosure.

Referring to FIG. 1, the present disclosure provides a method of producing waste plastic pyrolysis oil with reduced nitrogen, the method including: O1) depolymerizing polyethylene terephthalate (PET) with alcohol to obtain a depolymerization product; O2) separating monomers from the depolymerization product and recovering a remaining depolymerization residue; O3) introducing the depolymerization residue and waste plastics into a pyrolysis reactor and pyrolyzing the waste plastics; and O4) recovering pyrolysis oil from the pyrolysis reactor.

Polyethylene terephthalate is one of the most widely used plastics in various industrial fields due to its high strength and lightness. Alcohol depolymerization, one of the methods to recycle polyethylene terephthalate, is a method of depolymerizing polyethylene terephthalate using alcohol at a high temperature of 50 to 300° C. and a pressure of 1 to 40 atm. In particular, the alcohol depolymerization is one of the most widely used recycling methods because it has an advantage of being used to recycle polyethylene terephthalate present in solid waste. Ethylene glycol and alkyl terephthalate, which are produced by alcohol depolymerization of waste polyethylene terephthalate, are recovered as products of the alcohol depolymerization and reused as a feedstock for polyethylene terephthalate polymerization. Ethylene glycol, dimethyl terephthalate, and dimethyl terephthalate-like materials that are not separated, a catalyst, and various salts are disposed of as alcohol depolymerization residues. Embodiments of the present disclosure are particularly effective in reducing the content of nitrogen in the pyrolysis oil and improving waste recycling and the overall economic efficiency of a pyrolysis oil production process using an alcohol depolymerization residue of polyethylene terephthalate, which should be disposed of as waste, as an additive in a pyrolysis process of waste plastics.

The operation O1) is an operation of depolymerizing polyethylene terephthalate with alcohol to obtain a depolymerization product. The depolymerizing operation O1) includes mixing polyethylene terephthalate 1 with alcohol 2 and performing depolymerization at a high temperature and a high pressure to obtain ethylene glycol 4 and alkyl terephthalate 5, which are monomers in a polyethylene terephthalate polymerization process, as products, and in this case, polyethylene terephthalate may be waste polyethylene terephthalate.

A temperature of the depolymerization may be from 50 to 300° C., or from 60 to 200° C. or from 60 to 100° C. A pressure of the depolymerization may be from 1 to 40 atm, or from 1.1 to 20 atm, or from 1.2 to 10 atm, or from 1.5 to 5 atm, as a pressure exceeding normal pressure. A depolymerization time may be from 1 to 24 hours, or from 1 to 12 hours.

As a catalyst for the depolymerization, a metal salt such as an alkali metal, an alkaline earth metal, zinc, magnesium, or cobalt may be used, but the catalyst is not limited thereto.

The alcohol used in the depolymerization may be an aliphatic alcohol, for example, methanol or ethanol, and preferably, methanol.

The alcohol that reacts with polyethylene terephthalate in the depolymerization may be included in an amount of from 150 to 1,000 parts by weight, or from 200 to 800 parts by weight, with respect to 100 parts by weight of polyethylene terephthalate. In order to increase reaction efficiency, the depolymerization may be performed by adding alcohol in excess of the amount of polyethylene terephthalate. The alcohol added in excess may be discharged as vapor during the depolymerization and may be recycled as a polyethylene terephthalate depolymerization reactant.

Following the operation O1), the operation O2) is an operation of separating monomers from the depolymerization product 3 and recovering a remaining depolymerization residue 6. In the operation of recovering the depolymerization residue, alcohol included in excess is evaporated from a mixed solution containing ethylene glycol and alkyl terephthalate produced by depolymerization of polyethylene terephthalate, and then, a depolymerization residue generated in a process of separating ethylene glycol and alkyl terephthalate is recovered. In this case, ethylene glycol and alkyl terephthalate are separated through a separation column, and the separated ethylene glycol has sufficient purity to be reused as a feedstock of polyethylene terephthalate, but alkyl terephthalate needs to go through a recrystallization process because it requires higher purity in order to be reused as a feedstock of polyethylene terephthalate, and at this time, when a solution released during the recrystallization process is recovered, a residue of the polyethylene terephthalate depolymerization is obtained.

The residue of the polyethylene terephthalate depolymerization may include not only ethylene glycol and alkyl terephthalate that are not separated, but also materials such as alkyl isophthalate, a catalyst, a salt, and chlorine. Since the above materials are unevenly mixed in a high-viscosity liquid, these materials cannot be reused and are generally disposed of as waste, but when the depolymerization residue is used as an additive in the pyrolysis process of waste plastics, it is highly effective in reducing impurities, in particular, nitrogen, in pyrolysis oil.

Alkyl terephthalate and alkyl isophthalate may vary depending on the type of alcohol used in the depolymerization of polyethylene terephthalate. Specifically, an alkyl group of alkyl terephthalate or alkyl isophthalate may be a C1-C8 linear or branched alkyl group, and more specifically, a C1-C4 linear or branched alkyl group. More specifically, when methanol is used as the alcohol in the depolymerization of polyethylene terephthalate, alkyl terephthalate and alkyl isophthalate may be dimethyl terephthalate and dimethyl isophthalate, respectively.

The salt may include sulfate, and the sulfate may be an alkali metal sulfate or an alkaline earth metal sulfate. As the depolymerization product includes sulfate, in a subsequent hydrotreating process of waste plastic pyrolysis oil, deactivation of the catalyst may be prevented and the activity of the catalyst may be maintained at a constant level even without an additional sulfur source.

The ethylene glycol may be included in a lower limit of 10 wt % or more, 20 wt % or more, or 30 wt % or more, and an upper limit of 90 wt % or less or 85 wt % or less, with respect to the total weight of the depolymerization residue, and may be included in an amount of, specifically, 10 to 90 wt %, and more specifically, 10 to 85 wt %, with respect to the total weight of the depolymerization residue.

The alkyl terephthalate may be included in a lower limit of 5 wt % or more, 10 wt % or more, or 15 wt % or more, and an upper limit of 50 wt % or less, 40 wt % or less, or 35 wt % or less, with respect to the total weight of the depolymerization residue, and may be included in an amount of, specifically, 5 to 40 wt %, and more specifically, 5 to 35 wt %, with respect to the total weight of the depolymerization residue.

In addition, the salt may be included in an amount of 10 to 50 wt %, and specifically, 10 to 40 wt %, with respect to the total weight of the depolymerization residue. The sulfate may be included in a lower limit of 1 wt % or more, 2 wt % or more, or 5 wt % or more, and an upper limit of 30 wt % or less or 20 wt % or less, with respect to the total weight of the depolymerization residue, and may be included in an amount of, specifically, 1 to 30 wt %, and more specifically, 1 to 15 wt %, with respect to the total weight of the depolymerization residue.

As the ethylene glycol, alkyl terephthalate, and sulfate are included in the depolymerization residue in the contents described above, nitrogen in the pyrolysis oil may be effectively removed. In the related art, a Ca-based, Na-based, or zeolite-based catalyst is used as a catalyst for removing impurities when producing pyrolysis oil, but these catalysts may only remove up to 17% of nitrogen compared to the initial content of nitrogen contained in waste plastics, and thus, these catalysts have significantly low efficiency and are minimally effective. In comparison, the method of producing pyrolysis oil using the depolymerization residue of polyethylene terephthalate may remove about 70% of nitrogen compared to the initial content of nitrogen contained in waste plastics, such that a significant nitrogen reduction effect is exhibited compared to the catalyst for removing impurities according to the related art.

The polyethylene terephthalate depolymerization residue 6 obtained through the operations O1) and O2) is introduced into a pyrolysis reactor together with the waste plastics 7 in the operation O3), and pyrolysis of the waste plastics is performed.

In an embodiment, the waste plastics 7 introduced into the pyrolysis reactor in the pyrolysis operation O3) may be a solid phase. The pyrolysis reaction according to the present disclosure may be performed while effectively removing nitrogen, which is an impurity, even when the waste plastics are pulverized and introduced in a solid phase, and a liquefaction process for uniform mixing before the pyrolysis reaction is not required, and as a result, high economic efficiency may be obtained.

Specifically, the waste plastics 7 may be domestic waste plastic or industrial waste plastic. The domestic waste plastic may be a polyolefin-based waste plastic, specifically, examples thereof include polyethylene (PE) and polypropylene (PP), and may be a plastic in which polyvinylchloride (PVC), polystyrene (PS), polyethylene terephthalate (PET), polybutylene terephthalate (PBT), and the like in addition to PE and PP are mixed.

The pyrolysis reaction may be performed in a batch reactor. Specifically, the pyrolysis reaction may be performed in any reactor capable of controlling stirring and temperature increase, and for example, the pyrolysis may be performed in a rotary kiln type batch reactor, but the present disclosure is not limited thereto.

Specifically, a temperature of the pyrolysis may be from 300 to 900° C., more specifically, from 400 to 600° C., and still more specifically, from 450 to 580° C.

In an embodiment, the pyrolysis reaction may be performed in a non-oxidizing atmosphere. The non-oxidizing atmosphere is an atmosphere in which waste plastics do not oxidize (combust), and efficient pyrolysis may be performed in the above atmosphere. For example, the non-oxidizing atmosphere is, for example, an atmosphere in which an oxygen concentration is adjusted to 1 vol % or less, and may be an atmosphere of an inert gas such as nitrogen, water vapor, carbon dioxide, or argon. The pyrolysis process may be stably performed in a low-oxygen atmosphere in which an oxygen concentration is adjusted to 1 vol % or less. The pyrolysis reaction may be performed in a non-oxidizing atmosphere for 50 to 500 minutes, and when the above holding time is satisfied, the non-oxidizing atmosphere may be activated, the pyrolysis may be sufficiently performed, and energy consumption and operating time may be minimized, which is advantageous. Specifically, the holding time may be from 170 minutes to 330 minutes, and more specifically, from 200 minutes to 300 minutes.

The pyrolysis operation may be performed by including the depolymerization residue in a lower limit of 10 parts by weight or more or 15 parts by weight or more, and an upper limit of 50 parts by weight or less, 45 parts by weight or less, or 40 parts by weight or less, with respect to 100 parts by weight of the waste plastic feedstock. In the pyrolysis process, when the polyethylene terephthalate depolymerization residue is included in the above range with respect to the content of the waste plastic feedstock, the content of nitrogen may be minimized while minimizing the content of impurities in the pyrolysis oil. In addition, the yield and composition of the pyrolysis oil produced by including the depolymerization residue within the above range may be in similar ranges to those when pyrolysis is performed without including the depolymerization residue.

Pyrolysis gas 8 in the form of gas obtained when pyrolysis of waste plastics is performed is captured from O3) and transferred to a cooling separator O4) to remove off-gas and recover pyrolysis oil 9 in liquid form. The recovered pyrolysis oil 9 may be stored in a pyrolysis oil recovery unit (not shown).

In an embodiment, the method of producing pyrolysis oil with reduced nitrogen may further include, after the operation O4 of recovering the pyrolysis oil 9, a hydrotreating operation O5) of the recovered pyrolysis oil 9. The hydrotreating operation O5) is an operation of allowing waste plastic pyrolysis oil 9 to react with hydrogen gas 10 added in the hydrotreating unit to remove impurities. The pyrolysis oil is additionally dechlorinated, denitrified, and demetallized by the hydrotreating reaction, such that impurities such as chlorine, nitrogen, and metals and some olefins may be removed. Impurities are removed as gas 11 and refined hydrotreated pyrolysis oil 12 is obtained in a condenser O6 with reduced impurities.

A temperature in the hydrotreating operation O5) may be from 300 to 500° C., specifically, from 350 to 420° C., and more specifically, from 370 to 400° C. When the hydrotreating is performed in the temperature range described above, impurities including nitrogen may be further removed, and also the moisture content in the refined pyrolysis oil may be minimized to prevent corrosion and catalyst deactivation during the process. In the temperature range described above, moisture in the waste plastic pyrolysis oil may be effectively removed, and thus, corrosion and catalyst deactivation may be suppressed, and phenomena such as coking due to thermal cracking may be suppressed.

A pressure in the hydrotreating operation may be more than 60 bar and less than 120 bar, specifically, 65 bar to 110 bar, and more specifically, 70 bar to 100 bar. In the pressure range described above, impurities including chlorine and nitrogen may be effectively removed, and formation of an ammonium salt ($NH_4Cl$) may be suppressed.

The hydrotreating operation may be performed using an active metal as a catalyst. The type of the catalyst is not limited. Specifically, an active metal may be included as a catalyst, or a catalyst supported on a support may be used. The active metal may include one or two or more selected from molybdenum, nickel, cobalt, and tungsten. In the related art, sulfur should be additionally supplied to activate the active metal by sulfidizing the active metal in the hydrotreating operation. On the other hand, in the present disclosure, as the polyethylene terephthalate depolymerization residue is added as an additive in the pyrolysis process, the catalytic activity may be maintained without supplying additional sulfur in the hydrotreating operation, such that impurities other than nitrogen may be continuously removed through the hydrotreating process, and as a result, high-quality pyrolysis oil may be provided.

That is, the depolymerization residue of polyethylene terephthalate is included in the pyrolysis process of waste plastics of the present disclosure, such that the content of nitrogen in the pyrolysis oil is reduced, and furthermore, the content of sulfate in the pyrolysis oil increases. Therefore, there is no need to additionally supply sulfur in the subsequent hydrotreating operation, and the effect of reducing impurities other than nitrogen is exhibited, and as a result, the quality improvement of pyrolysis oil may be maximized.

Preparation Example 1

Waste polyethylene terephthalate was added to a reactor into which an alkali metal salt catalyst was introduced in the form of a polyethylene terephthalate oligomer sludge, and the temperature was increased to 270° C. Separately, a temperature of a methanol liquid was increased to 270° C. at a rate of 20 cc/min and injected into the reactor. When a liquid level in the reaction device was reduced as the reaction proceeded, this state was detected by a sensor, and an oligomer sludge feedstock melted to 200° C. was injected from a feedstock tank into the reactor to replenish the feedstock.

A reaction product was separated through the top together with methanol and transferred to a separation and refining unit, the transferred product and methanol were cooled, and dimethyl terephthalate (DMT) was recrystallized, thereby obtaining solid dimethyl terephthalate and a polyethylene terephthalate depolymerization residue. It was shown that, in the depolymerization residue, 60 wt % of ethylene glycol, 15 wt % of dimethyl terephthalate and a derivative thereof, and 25 wt % of the balance containing the catalyst, salt, and methanol, were included.

Example 1

Domestic waste plastic pellets were prepared by extruding domestic mixed plastics including polyethylene, polypropylene, and polyvinyl chloride at 250° C. Pyrolysis was performed by adding about 70 g dry weight of the domestic waste plastic pellets and 5 g of a polyethylene terephthalate methanol depolymerization residue to a batch reactor and increasing the temperature of the reactor to 500° C. in a non-oxidizing atmosphere. After the pyrolysis was completed, pyrolysis oil was recovered. The impurities contained in the pyrolysis oil are shown in Table 1.

Example 2

The same process as that of Example 1 was performed, except that 20 g of the polyethylene terephthalate methanol depolymerization residue was added.

Example 3

The same process as that of Example 1 was performed, except that 30 g of the polyethylene terephthalate methanol depolymerization residue was added.

Example 4

The same process as that of Example 1 was performed, except that 40 g of the polyethylene terephthalate methanol depolymerization residue was added.

Example 5

The same process as that of Example 1 was performed, except that 50 g of the polyethylene terephthalate methanol depolymerization residue was added.

Example 6

Figure 2:
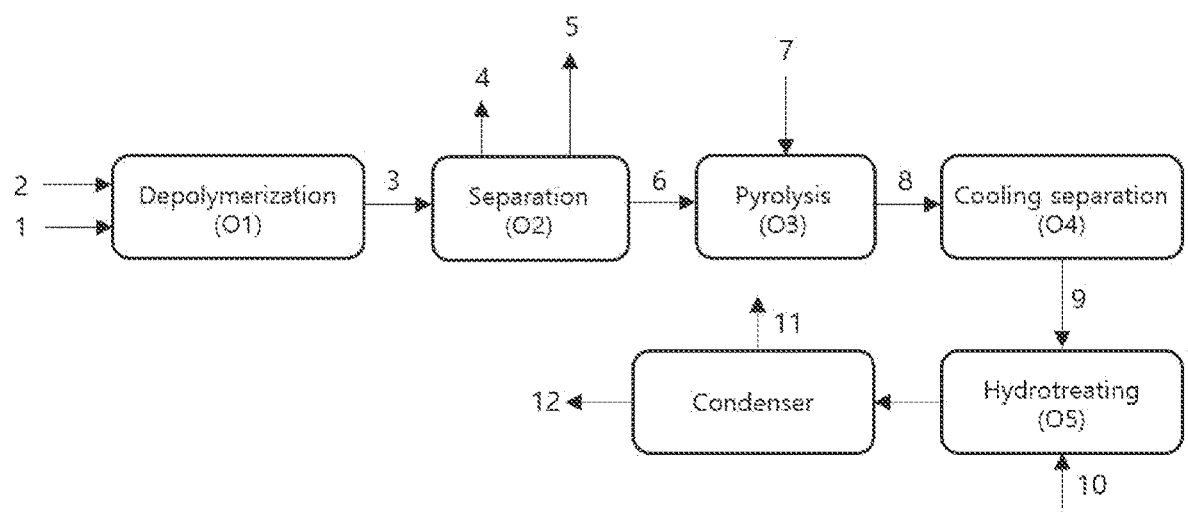
FIG. 2 is a schematic view illustrating a process according to an embodiment of the present disclosure.

The pyrolysis oil obtained in Example 2 was supplied to a hydrotreating reactor (See O4), of FIG. 2) in which a hydrotreating catalyst was fixed therein. Impurities were removed and hydrotreated pyrolysis oil was obtained in the hydrotreating reactor, and pyrolysis gas 11 was captured in a condenser O6, thereby recovering refined pyrolysis oil 12 with reduced impurities.

Comparative Example 1

The same process as that of Example 1 was performed, except that sodium sulfate ($Na_2SO_4$) was used as an additive rather than the polyethylene terephthalate methanol depolymerization residue.

Comparative Example 2

The same process as that of Example 1 was performed, except that an FCC-equilibrium catalyst (E-Cat) was used as an additive rather than the polyethylene terephthalate methanol depolymerization residue.

Comparative Example 3

The same process as that of Example 1 was performed, except that calcium oxide (CaO) was used as an additive rather than the polyethylene terephthalate methanol depolymerization residue.

Comparative Example 4

The same process as that of Example 1 was performed, except that a polyethylene terephthalate methanol depolymerization residue was not included as an additive.

TABLE 1

|  | Example 1 | Example 2 | Example 3 | Example 4 | Example 5 |
|---|---|---|---|---|---|
| Amount of *feedstock added (g) | 70 | 70 | 70 | 70 | 70 |
| Additive | *PET depolymerization residue | *PET depolymerization residue | *PET depolymerization residue | *PET depolymerization residue | *PET depolymerization residue |
| Content of additive (g) | 5 | 20 | 30 | 40 | 50 |
| Content of nitrogen in pyrolysis oil (ppm) | 1,361 | 690 | 672 | 669 | 540 |
| Content of sulfur in pyrolysis oil (ppm) | 221 | 770 | 798 | 806 | 1,149 |
| Content of naphtha in pyrolysis oil (wt %) | 24 | 35 | 41 | 33 | 13 |
| Content of *LGO in pyrolysis oil (wt %) | 29 | 41 | 45 | 39 | 35 |
| Content of *AR in pyrolysis oil (wt %) | 47 | 24 | 23 | 28 | 52 |

|  | Comparative Example 1 | Comparative Example 2 | Comparative Example 3 | Comparative Example 4 |
|---|---|---|---|---|
| Amount of *feedstock added (g) | 70 | 70 | 70 | 70 |
| Additive | $Na_2SO_4$ | *FCC E-Cat | CaO | — |
| Content of additive (g) | 20 | 20 | 20 | — |
| Content of nitrogen in pyrolysis oil (ppm) | 1,760 | 1,840 | 2,020 | 2,110 |
| Content of sulfur in pyrolysis oil (ppm) | 70 | 19 | 20 | 28 |
| Content of naphtha in pyrolysis oil (wt %) | 16 | 28 | 11 | 12 |

TABLE 1-continued

|  | | | | |
|---|---|---|---|---|
| Content of *LGO in pyrolysis oil (wt %) | 30 | 60 | 27 | 31 |
| Content of *AR in pyrolysis oil (wt%) | 55 | 12 | 52 | 57 |

*Feedstock: Domestic waste plastics
*PET: Polyethylene terephthalate
*LGO: Light gas oil
*AR: Atmospheric Residue
*FCC E-Cat: FCC-equilibrium Catalyst In the case of Example 2 in which 20 g of the polyethylene terephthalate methanol depolymerization residue was included, it was confirmed that the content of nitrogen was reduced by 70% or more compared to the initial content of nitrogen contained in domestic waste plastics provided as a feedstock. On the other hand, in the cases of Comparative Examples 1 to 4 in which the polyethylene terephthalate depolymerization residue was not included, it was confirmed that the content of nitrogen was reduced by about 10% compared to the initial content of nitrogen contained in domestic waste plastics provided as a feedstock. Therefore, it was confirmed that the content of nitrogen as an impurity was significantly reduced when the polyethylene terephthalate depolymerization residue was included in the pyrolysis process. In the case of Example 1 in which the amount of polyethylene terephthalate depolymerization residue included was too small compared to the amount of the feedstock, the nitrogen reduction effect was poor. In Example 5 in which the amount of PET depolymerization residue included was too large, the nitrogen reduction effect was excellent, but as a large amount of the polyethylene terephthalate depolymerization residue provided as a viscous liquid and containing a large amount of various impurities was included, the yield of naphtha and light gas oil (LGO) obtained from the pyrolysis oil decreased, and thus, the content of atmospheric residue (AR) was high.

In addition, in Example 2 in which the polyethylene terephthalate depolymerization residue was further included, the activity of the catalyst was maintained without additionally supplying sulfur in the hydrotreating operation, and thus, the continuous operation of the hydrotreating reactor was realized. However, in Comparative Examples 2 to 4 except for Comparative Example 1 in which sulfur was included as a catalyst, the activity of the catalyst was reduced, and thus, the continuous operation was realized only when sulfur was additionally supplied in the hydrotreating operation. That is, in Examples 1 to 5 in which the polyethylene terephthalate depolymerization residue was included, it was confirmed that the continuous operation was realized without adding an additional catalyst activating component in the subsequent hydrotreating process to remove impurities in the pyrolysis oil, and thus, the process was performed more economically.

The method of producing waste plastic pyrolysis oil with reduced nitrogen according to the present disclosure may achieve carbon neutrality by suppressing air pollution and greenhouse gas emissions, and may be used in environmental technology and resource recycling technology to prevent environmental pollution and climate change caused by landfilling or incineration of waste plastics.

As set forth above, the method of producing waste plastic pyrolysis oil according to an embodiment of the present disclosure may provide waste plastic pyrolysis oil in which a content of impurities, in particular, nitrogen is minimized despite pyrolyzing waste plastics without sorting or pretreatment of waste plastics containing impurities.

Further, according to an embodiment of the present disclosure, the method of producing waste plastic pyrolysis oil may improve a waste resource recycling effect and economic efficiency of a refining process of pyrolysis oil using a depolymerization residue of waste polyethylene terephthalate (PET) as an additive in a pyrolysis process.

Hereinabove, although the present disclosure has been described by specific matters and limited embodiments, they have been provided only for assisting in the entire understanding of the present disclosure. Therefore, the present disclosure is not limited to the embodiments. Various modifications and changes may be made by those skilled in the art to which the present disclosure pertains from this description.

Therefore, the technical concept of the present disclosure should not be limited to these embodiments, but the claims and all modifications equal or equivalent to the claims are intended to fall within the scope and concept of the present disclosure. Furthermore, the embodiments may be combined to form additional embodiments.

What is claimed is:

1. A method of producing waste plastic pyrolysis oil with reduced nitrogen, the method comprising:
    O1) depolymerizing polyethylene terephthalate (PET) with alcohol to obtain a depolymerization product;
    O2) separating monomers from the depolymerization product and recovering a remaining depolymerization residue;
    O3) introducing the depolymerization residue and waste plastics into a pyrolysis reactor and pyrolyzing the waste plastics;
    O4) recovering pyrolysis oil in the pyrolysis reactor; and
    O5) hydrotreating the pyrolysis oil.

2. The method of claim 1, wherein in operation O3), the waste plastics are supplied in a solid phase to the pyrolysis reactor.

3. The method of claim 1, wherein the alcohol is methanol or ethanol.

4. The method of claim 1, wherein the depolymerization residue includes sulfate.

5. The method of claim 4, wherein the sulfate is included in an amount of 1 to 30 wt % with respect to the total weight of the depolymerization residue.

6. The method of claim 4, wherein the sulfate includes an alkali metal sulfate or an alkaline earth metal sulfate.

7. The method of claim 1, wherein the depolymerization residue includes ethylene glycol.

8. The method of claim 7, wherein the ethylene glycol is included in an amount of 10 to 85 wt % with respect to the total weight of the depolymerization residue.

9. The method of claim 1, wherein the depolymerization residue includes alkyl terephthalate.

10. The method of claim 1, wherein the depolymerization residue is included in an amount of 15 to 45 parts by weight with respect to 100 parts by weight of the waste plastics.

11. The method of claim 1, wherein a pyrolysis temperature during the pyrolysis reaction is 300 to 900° C.

12. The method of claim 1, wherein operation O5) occurs at a temperature of 300 to 500° C.

13. The method of claim 1, wherein operation O5) occurs at a pressure of greater than 60 bar and less than 120 bar.

14. The method of claim 1, wherein operation O5) occurs in the presence of a catalyst.

15. The method of claim 14, wherein the catalyst is an active metal selected from the group consisting of molybdenum, nickel, cobalt, and tungsten.

16. The method of claim 15, wherein operation O5) includes supplying sulfur to activate the active metal.

\* \* \* \* \*